United States Patent
Brandt et al.

(10) Patent No.: US 8,054,170 B1
(45) Date of Patent: Nov. 8, 2011

(54) CHARACTERIZING AND REPRESENTING IMAGES

(75) Inventors: Jonathan W. Brandt, Santa Cruz, CA (US); Feng Tang, Santa Cruz, CA (US)

(73) Assignee: Adobe Systems Incorporated, San Jose, CA (US)

( * ) Notice: Subject to any disclaimer, the term of this patent is extended or adjusted under 35 U.S.C. 154(b) by 107 days.

(21) Appl. No.: 12/324,241

(22) Filed: Nov. 26, 2008

Related U.S. Application Data (60) Provisional application No. 61/101,560, filed on Sep. 30, 2008.

(51) Int. Cl.
 *B60Q 1/00* (2006.01)
(52) U.S. Cl. .................. 340/453; 340/573.1; 340/5.53; 340/5.83; 382/251; 382/209; 382/276; 382/190
(58) Field of Classification Search .................. 340/505, 340/573.1, 5.52, 5.53, 5.8, 5.82, 5.83; 382/251, 382/209, 276, 190
See application file for complete search history.

(56) References Cited

U.S. PATENT DOCUMENTS

| | | | | |
|---|---|---|---|---|
| 7,664,333 B2 * | 2/2010 | Kasutani | ...... | 382/251 |
| 2006/0093221 A1 * | 5/2006 | Kasutani | ...... | 382/191 |
| 2006/0147094 A1 * | 7/2006 | Yoo | ...... | 382/117 |
| 2007/0071323 A1 * | 3/2007 | Kontsevich et al. | ...... | 382/190 |
| 2009/0148068 A1 * | 6/2009 | Woodbeck | ...... | 382/305 |
| 2010/0257252 A1 * | 10/2010 | Dougherty et al. | ...... | 709/217 |

OTHER PUBLICATIONS

Marc Cavazza, et al., "Multimedia Semantic Features and Image Content Description," Oct. 1998.

* cited by examiner

*Primary Examiner* — Daryl Pope
(74) *Attorney, Agent, or Firm* — Robert C. Kowert; Meyertons, Hood, Kivlin, Kowert & Goetzel, P.C.

(57) ABSTRACT

A method, system, and computer-readable storage medium for characterizing and representing images. A plurality of feature descriptors for a plurality of images are received, where each feature descriptor encodes a respective feature in an image, and where each feature descriptor is transformed into a plurality of sub-descriptors in accordance with a specified transformation scheme. The feature descriptors correspond to an image feature descriptor space for the plurality of images, and the sub-descriptors correspond to a plurality of subspaces of the image feature descriptor space, where the plurality of subspaces span the image feature descriptor space. Each subspace of the plurality of subspaces is quantized using cluster analysis applied to the sub-descriptors, thereby determining a respective one or more feature primitives for each subspace, where the feature primitives are useable to characterize image features.

49 Claims, 6 Drawing Sheets

CHARACTERIZING AND REPRESENTING IMAGES

PRIORITY DATA

This application claims benefit of priority to U.S. Provisional Application Ser. No. 61/101,560 titled "Characterizing and Representing Images", filed Sep. 30, 2008, whose inventors are Jonathan W. Brandt and Feng Tang, and which is hereby incorporated by reference in its entirety.

BACKGROUND

1. Field of the Invention

The present invention is directed generally to digital image processing, and more particularly to analysis, characterization, and representation of images.

2. Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

How to represent an image is a fundamental problem in many image (including video) analysis and synthesis applications. Images are often analyzed and characterized in terms of their respective features, e.g., the presence of human faces (or not), as well as more primitive attributes such as edges, blobs, corners, etc. In particular, current high-performance image search/retrieval applications generally rely on a bag-of-features (BoF) representation, e.g., characterization based on an unordered collection of features, based on local features of images.

In addition to characterizing the local image appearance and structure, these local features are usually designed to be robust with respect to changes in rotation, scale, illumination and difference in viewpoint. These approaches first localize the features at a sparse set of distinctive image points—usually called interest points or key points; this process is performed by a feature detector. Then the feature vectors are computed based on the local image patches centered at these locations, this process is performed by a feature descriptor. The hypothesis is that detectors select stable and reliable image locations which are informative about image content and the descriptor describes the local patch in a distinctive way with a feature vector (usually a much lower dimension as the original patch). The overall performance of the local feature depends on the reliability and accuracy of the localization and distinctiveness of the description. Two major advantages of sparse local features is the robustness to changes in viewpoints, lighting, etc., and the compactness of the representation.

The bag-of-features (BoF) representation is an extension of the bag-of-words representation used in text classification. The basic idea of BoF is to represent each image as an unordered collection of local features. For compact representation in BoF, a "visual vocabulary" is usually constructed in a training phase via the clustering of local feature descriptors with respect to a collection of images. Each feature descriptor cluster is treated as a "visual word" in the visual vocabulary. Through mapping the feature descriptors in an image to the visual vocabulary, the image may be described with a feature vector according to the presence frequency of each visual word. This so-called term-frequency vector is then used to perform high level inference, such as image categorization/recognition/retrieval. The BoF approach, although it is simple and does not contain any geometry information, has demonstrated excellent performance for various visual classification and retrieval tasks.

The key component in the bag-of-features representation is the construction of the visual vocabulary. Existing approaches include k-means, hierarchical k-means, approximate k-means, and regular quantization, among others. Regular quantization is very fast but performs poorly for image retrieval. The approximate k-means (AKM) performs well for image search, where a randomized forest for cluster centers is built to accelerate the nearest neighbor search for each data point. The complexity of this algorithm is $O(MN \log K)$ where M is the dimensionality of the feature and N is the number of data points and K is the number of clusters. However, this approach is still very slow due to the fact that the feature representation is high dimensional (e.g., 128 dimensional scale-invariant image transform (SIFT) descriptors), and the number of features is huge, e.g., for a typical 5000 image database (with typical image resolution of 1024×768), the number of SIFT features is more than 26 million. Additionally, using these approaches, it is difficult to handle a large amount of data in a reasonable amount of time, and to cluster such a large number of features.

SUMMARY

Various embodiments of systems, methods, and computer-readable storage media for characterizing and representing images are presented.

A plurality of feature descriptors for a plurality of images may be received, where each feature descriptor encodes a respective feature in an image, and where each feature descriptor is transform into, e.g., is partitioned into, a plurality of sub-descriptors in accordance with a specified transformation scheme. The feature descriptors may correspond to an image feature descriptor space for the plurality of images, and the sub-descriptors may correspond to a plurality of subspaces of the image feature descriptor space, where the plurality of subspaces span the image feature descriptor space.

The feature descriptor encodes a feature of an image, and each sub-descriptor encodes a respective feature component of the feature described by the feature descriptor. More specifically, each feature descriptor may include a specified number of elements, where each element corresponds to a respective dimension of the image feature descriptor space, where each sub-descriptor includes a respective subset of the elements of the feature descriptor, and where each sub-descriptor encodes a respective feature component of the feature. Thus, the ordered sub-descriptors of a feature descriptor may specify or represent an ordered set of feature components that collectively form a feature in an image, as will be discussed below in more detail.

The sub-descriptors may be specified or defined in accordance with any of various transformation schemes. For example, in one embodiment, at least one of the sub-descriptors is or includes a transformation of a contiguous subset of the elements of the feature descriptor. In another embodiment, at least one of the sub-descriptors is or includes a transformation of a discontiguous subset of the elements of the feature descriptor. In a further embodiment, at least two of the sub-descriptors may include respective transformations of overlapping subsets of the elements of the feature descriptor. Thus, in various embodiments, the sub-descriptors may be defined to include transformations of any or all of the elements of the feature descriptor.

Note that in various embodiments, the transformation scheme may be a partition, or may involve more complex transforms, e.g., linear and/or non-linear transforms applied to any or all of the elements of the feature descriptor. In an exemplary illustrative and greatly simplified example, consider a feature descriptor with elements a, b, c, d, ..., z. A transformation scheme that simply partitions the descriptor may yield sub-descriptors such as: abc; def; ghi; and so on, where each sub-descriptor contains a contiguous subset of elements from the feature descriptor. A slightly more complex partitioning is acegik ... ; and bdfhjl ... ; where each sub-descriptor includes every other element, e.g., where the sub-descriptors include interleaved subsets of the feature descriptor elements. An exemplary transformation scheme that utilizes a non-linear transform of subsets of the elements is: (a*b)+(b*c)+(c*d); (b*c)+(c*d)+(d*e); etc., where each sub-descriptor is specified by a sum of three products of elements from a moving window of four contiguous elements. Note that these transformation schemes are not intended to be taken as useful schemes, but merely to illustrate the breadth of the types of transformation schemes contemplated, and are not intended to limit the transformation schemes to any particular types or numbers of transform.

Each feature descriptor based on the feature descriptor space may be associated with a corresponding image patch (that contains the feature), and may have a structure that corresponds to the structure of the patch, spatial or otherwise, and so may correspond to image data for the image patch. Thus, each sub-descriptor may correspond to a portion or subset of image data for an image patch of an image. For example, each sub-descriptor may be or include a transform (possibly including, for example, a simple partition) of a respective portion of the image data for an image patch of an image. Similar to the above, in some embodiments, at least one of the subsets of image data is or includes a contiguous subset of the image data. In other embodiments, at least one of the subsets of image data is or includes a discontiguous subset of the image data. In further embodiments, at least two of the subsets of image data may be overlapping subsets of the image data.

Thus, the feature descriptor (and similarly, the image feature descriptor space) may be transformed, e.g., partitioned, into sub-descriptors (sub-spaces) that may be specified to correspond to respective (and possibly overlapping) portions or partitions of image data for specified image patches, where the portions or partitions may be spatial or non-spatial, and where each sub-descriptor may be specified to encode a corresponding feature component. Thus, in various embodiments, the image feature descriptor space (and thus, corresponding feature descriptors) may include a plurality of subspaces (with corresponding sub-descriptors) in accordance with any of a variety of partitioning schemes, so long as the subspaces collectively span the descriptor space.

Each subspace of the plurality of subspaces may be quantized using cluster analysis applied to the sub-descriptors, thereby determining a respective one or more feature primitives for each subspace, where the feature primitives are useable to characterize image features. Note that the quantization/clustering is performed in each lower dimensional subspace, and so is much more computationally tractable than quantizing/clustering the overall feature descriptor space.

In some embodiments, the method may further include determining the feature descriptors. For example, the method may include: for each image of the plurality of images, analyzing the image to determine one or more key points that indicate or are associated with corresponding features in the image, then, for each key point, determining a respective image patch that includes the key point, and for each respective image patch, determining a corresponding feature descriptor (and so the receiving the plurality of feature descriptors may mean or include receiving the determined feature descriptors). Then, for each point of interest, the image patch that includes the point may be analyzed to detect and characterize the associated feature and its components. More specifically, each image patch (that includes a key point) may be partitioned into sub-patches per the specified partitioning scheme, and the sub-patches analyzed to populate the sub-descriptors, thereby populating the feature descriptor for that patch.

Recapitulating the above, once the various features and feature components in the image patches (for each image) are detected, cluster analysis may be performed per sub-space, i.e., per specified sub-descriptor, to quantize the classification of the numerous feature components into a smaller number of distinguishing component types or classes, referred to as feature primitives. In other words, cluster analysis is applied to the detected feature components to determine natural groupings of the components, which may correspond to a set of natural feature primitives that may be used to represent features, e.g., where each feature may be represented by an ordered sequence of feature components, and thus, each feature descriptor may include an ordered sequence of sub-descriptors, per the transformation scheme specified. The feature primitives may be used to characterize images, e.g., for use in image operations such as image classification, search/retrieval, and matching, among others.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Embodiments of the systems and methods described herein may be used to analyze, characterize, and represent, digital images, e.g., digital photographs, digital art, scans of artwork, etc., and the representations of the images may be useful in image search applications In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
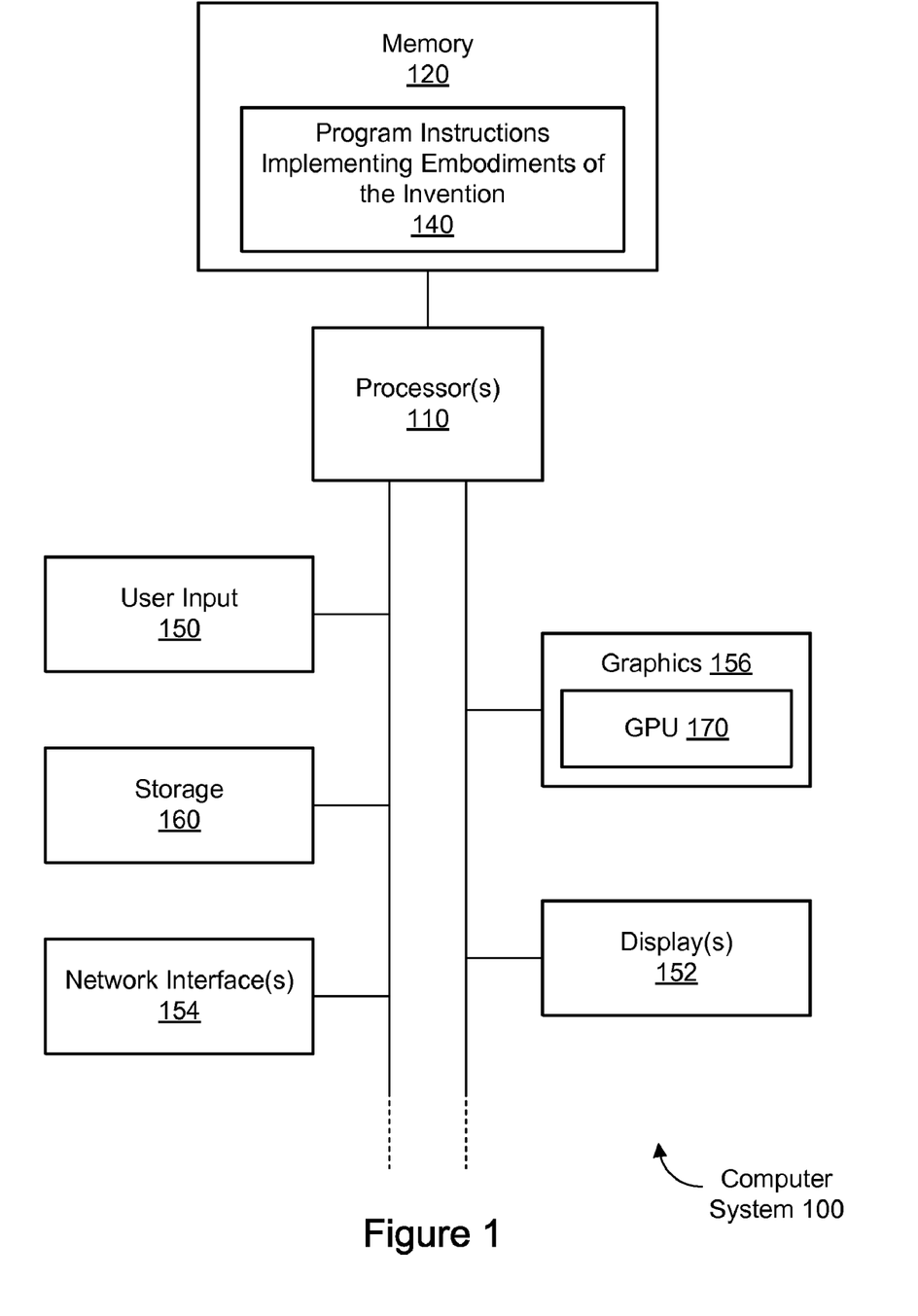
FIG. 1 is a block diagram of an exemplary system configured to implement embodiments of the present invention.

FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
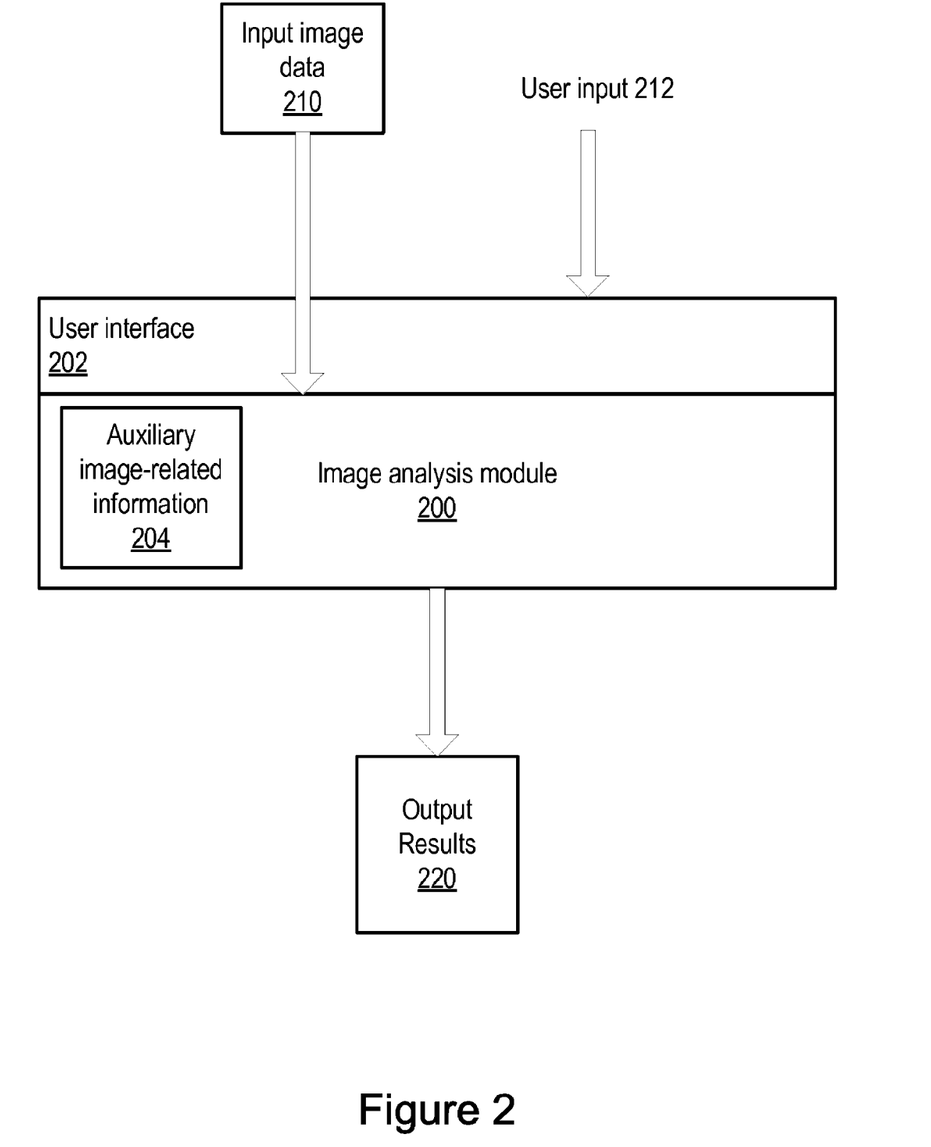
FIG. 2 illustrates an exemplary image analysis module, according to one embodiment.

FIG. 2 illustrates an exemplary image analysis module that may implement embodiments of methods disclosed herein, as described below with reference to FIGS. 3, 4, and 5. In one embodiment, module 200 may provide a user interface 202 that includes one or more user interface elements via which a user may initiate, interact with, direct, and/or control the method performed by module 200. Module 200 may be operable to obtain digital image data for a digital image 210, receive user input 212 regarding the image data, analyze the image data and/or the input, and output analysis results for the image data 220. In one embodiment, the module may include or have access to additional or auxiliary image-related information, e.g., a collection of representative images, feature descriptors, a visual alphabet, etc., as will be discussed in detail below. Further details regarding the functionality provided by the module 200 are discussed below.

Image analysis module 200 may be implemented as or in a stand-alone application or as a module of or plug-in for an image processing application. Examples of types of applications in which embodiments of module 300 may be implemented may include, but are not limited to, image (including video) analysis, characterization, search, processing, and/or presentation applications, as well as applications in security or defense, educational, scientific, medical, publishing, digital photography, digital films, games, animation, marketing, and/or other applications in which digital image analysis, characterization, representation, or presentation may be performed. Specific examples of applications in which embodiments may be implemented include, but are not limited to, Adobe® Photoshop® and Adobe® Illustrator®. Module 200 may also be used to display, manipulate, modify, classify, and/or store images, for example to a memory medium such as a storage device or storage medium.

Overview

Embodiments of the techniques disclosed herein may provide for characterization and representation of digital images, e.g., for use in searching or managing digital images. More specifically, techniques are described for determining a visual "alphabet" or graphical component basis for characterizing and representing local features in digital images, and employing this visual alphabet to perform any of various image operations, e.g., image characterization or representation, categorization or classification, search/retrieval, and/or matching, among others.

Figure 3:
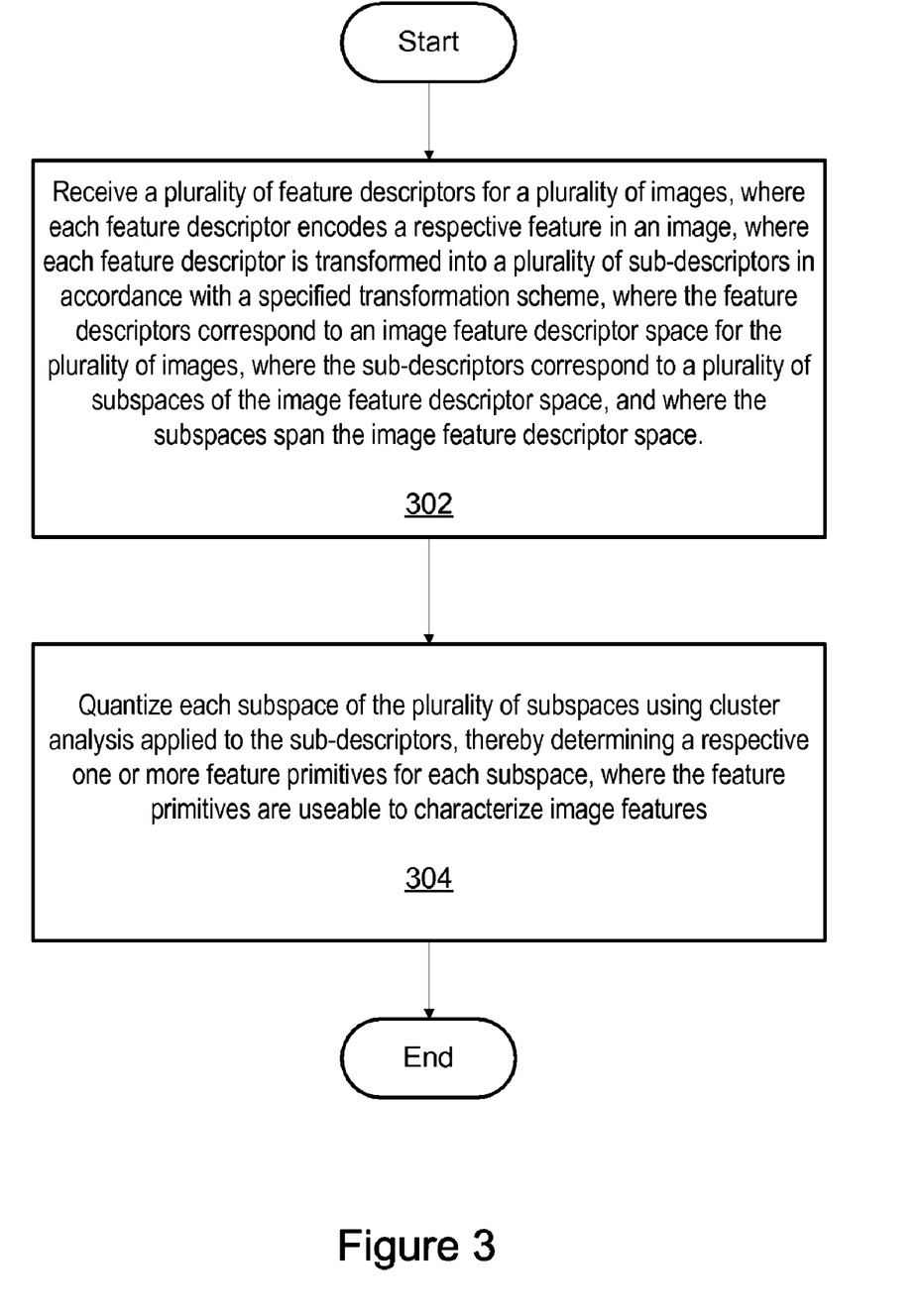
FIG. 3 is a flowchart illustrating a method for determining a visual alphabet for analyzing digital images, according to one embodiment.

FIG. 3—Method for Determining a Visual Alphabet for Analyzing Digital Images FIG. 3 is a flowchart of a method for determining a visual alphabet for analyzing digital images, according to one embodiment. The method shown in FIG. 3 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

In 302, a plurality of feature descriptors for a plurality of images may be received, where each feature descriptor encodes a respective feature in an image, and where each feature descriptor is transformed into, e.g., is partitioned into, a plurality of sub-descriptors in accordance with a specified transformation scheme. The feature descriptors may correspond to an image feature descriptor space for the plurality of images, and the sub-descriptors may correspond to a plurality of subspaces of the image feature descriptor space, where the plurality of subspaces span the image feature descriptor space.

Thus, the image feature descriptor space, represented by the feature descriptor, is decomposed via a specified transformation scheme into several lower dimensional subspaces, with each subspace represented by a respective sub-descriptor capturing some less dependent information of the entire feature descriptor. For example, in an embodiment that uses SIFT descriptors, a SIFT descriptor, which is a 128 element (dimension) descriptor for a feature, the 128 elements or dimensions may be partitioned or subdivided into a set of fields that each represents a respective subspace, e.g., four 32-element fields, corresponding to four 32 dimensional subspaces. Note that each subspace is a proper subspace of the image feature descriptor space, i.e., each subspace is smaller than the descriptor space of which it is a part. Note that in some embodiments, the sub-descriptor fields may overlap and/or may include discontiguous elements, as described below in more detail.

Note further that in various embodiments, the transformation scheme may be a partition, as described above, or may involve more complex transforms, e.g., linear and/or non-linear transforms applied to any or all of the elements of the feature descriptor. In an exemplary illustrative and greatly simplified example, consider a feature descriptor with elements a, b, c, d, . . . , z. A transformation scheme that simply partitions the descriptor may yield sub-descriptors such as: abc; def; ghi; and so on, where each sub-descriptor contains a contiguous subset of elements from the feature descriptor. A slightly more complex partitioning is acegik . . . ; and bdfhjl . . . ; where each sub-descriptor includes every other element, e.g., where the sub-descriptors include interleaved subsets of the feature descriptor elements. An exemplary transformation scheme that utilizes a non-linear transform of subsets of the elements is: $(a*b)+(b*c)+(c*d)$; $(b*c)+(c*d)+(d*e)$; etc., where each sub-descriptor is specified by a sum of three products of elements from a moving window of four contiguous elements. Note that these transformation schemes are not intended to be taken as useful schemes, but merely to illustrate the breadth of the types of transformation schemes contemplated, and are not intended to limit the transformation schemes to any particular types or numbers of transform.

The feature descriptor encodes a feature of an image, and each sub-descriptor encodes a respective feature component of the feature described by the feature descriptor. More specifically, each feature descriptor may include a specified number of elements, where each element corresponds to a respective dimension of the image feature descriptor space, where each sub-descriptor is or includes a transformation of a respective at least a subset of the elements of the feature descriptor, and where each sub-descriptor encodes a respective feature component of the feature. Thus, the ordered sub-descriptors of a feature descriptor may specify or represent an ordered set of feature components that collectively form a feature in an image, as will be discussed below in more detail. Note that in one embodiment, the plurality of subspaces span the image feature descriptor space.

As noted above, the sub-descriptors may be specified or defined in accordance with any of various transformation schemes. For example, in one embodiment, at least one of the sub-descriptors is or includes a transformation of a contiguous subset of the elements of the feature descriptor. In another embodiment, at least one of the sub-descriptors is or includes a transformation of a discontiguous subset of the elements of the feature descriptor. In a further embodiment, at least two of the sub-descriptors may include respective transformations of overlapping subsets of the elements of the feature descriptor. Thus, in various embodiments, the sub-descriptors may be defined to include transformations of any or all of the elements of the feature descriptor.

Note that each feature descriptor based on the feature descriptor space may be associated with a corresponding image patch (that contains the feature), and may have a structure that corresponds to the structure of the patch, spatial or otherwise, and so may correspond to image data for the image patch. Thus, each sub-descriptor may correspond to a portion or subset of image data for an image patch of an image. For example, each sub-descriptor may be or include a transform (possibly including, for example, a simple partition) of a respective portion of the image data for an image patch of an image. Similar to the above, in some embodiments, at least one of the subsets of image data is or includes a contiguous subset of the image data. In other embodiments, at least one of the subsets of image data is or includes a discontiguous subset of the image data. In further embodiments, at least two of the subsets of image data may be overlapping subsets of the image data.

Described another way, the specified subsets of image data may be or include image data of respective sub-patches of the image patch, where each sub-patch may be or include a spatial partition of the image patch, including a contiguous subset of pixels in the image patch, a non-spatial partition of the image patch, including attributes of the image patch that are distributed across the image patch, and/or a portion of the image patch that overlaps at least one other sub-patch of the image patch. Thus, each sub-descriptor may correspond to a sub-patch of the patch, and the ordered sub-descriptors (composing the feature descriptor) may correspond to respective ordered sub-patches of the patch, where a sub-patch may include contiguous and/or non-contiguous portions (e.g., pixels) of the image patch.

Figure 6A:
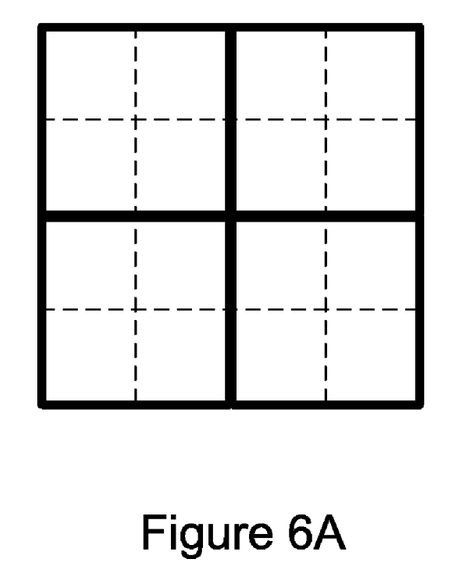
FIGS. 6A and 6B illustrate exemplary spatial partitioning schemes, according to one embodiment.
Figure 6B:
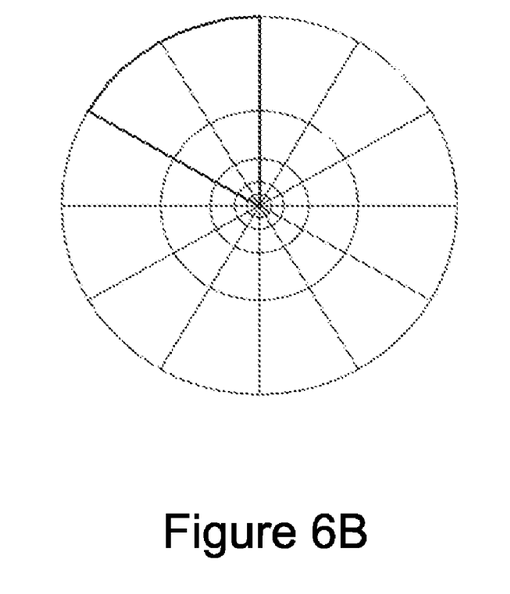

FIGS. 6A and 6B illustrate exemplary spatial partitioning schemes, i.e., where the transformation scheme is a spatial partitioning. FIG. 6A, for example, illustrates an exemplary patch divided into 16 sub-patches, indicated by dashed lines, e.g., in accordance with a SIFT-based analysis. Following the SIFT approach, in some embodiments, each sub-descriptor may be formed by building histogram statistics of some low-level features, e.g., pixel gradients, together with some structure information of the local image patch. For example, in one embodiment, the SIFT descriptor may divide the local image patch into 4×4=16 sub-patches and an 8 dimension gradient (grayscale) histogram (8 directions, weighted by gradient magnitude) may be computed for each sub-patch. In other words, for each pixel in the sub-patch, a gradient may be computed and binned per direction, weighted by the gradient magnitude. The final descriptor may then be a concatenation of these sub-patch gradient histograms in a pre-defined order, with dimensionality of 4×4×8=128. Of course, other attributes of the patches may be used as desired (other than or in addition to, the above-described histograms). Moreover, note that other values for the dimensionality of the gradient direction may be used, e.g., 36 directions rather than 8, and so forth.

As FIG. 6A indicates, an alternative spatial partitioning is also presented, where the patch is divided into four quadrants, each containing 4 of the original sub-patches, and each of which may be referred to as a sub-descriptor patch. Thus, in this embodiment, the feature descriptor space, and thus, a corresponding feature descriptor, is decomposed into four sub-spaces, and thus, a corresponding four sub-descriptors, each corresponding to a respective sub-descriptor patch. Thus, a feature descriptor of this image patch may include an ordered sequence of these four sub-descriptors corresponding to an ordered list of these four sub-descriptor patches.

As discussed above, the transformation scheme, or in this case, the decomposition/partitioning, is not restricted to SIFT nor to any particular patch partitioning or transformation scheme; any other type of descriptor that has subsets of elements corresponding to defined or specified sub-patches (spatial or otherwise) can be transformed, e.g., decomposed or partitioned. For example, in other embodiments, the patch of FIG. 6A may be partitioned into 16 sub-patches, per a common SIFT approach, resulting in 16 sub-spaces, and thus, a corresponding 16 sub-descriptors. Alternatively, the patch may be partitioned according to any of a variety of other spatial partitioning schemes, e.g., three equal vertical or horizontal stripes, concentric square annuli, etc., or non-spatial partitioning schemes, as desired.

As another example of spatial partitioning, FIG. 6B illustrates decomposition or partitioning of a circular/disc-shaped patch, in which the sub-patches are defined in log-polar space, and can also be divided in many ways. One partition scheme is shown in FIG. 6B, where the patch is divided into "pie slices". In another embodiment, the patch may be partitioned into concentric annuli. This approach may be beneficial when features are themselves somewhat radial in nature, e.g., bullet holes, eyes, etc. Thus, for example, in the case of bullet hole analysis, some type of radially symmetric or elliptical patch/partition may be appropriate. Other shapes and partitions may be used as desired, including, for example, disjoint partitions. Note that in further embodiments, the sub-descriptor patches may overlap. In other words, portions of a patch may belong to more than one sub-descriptor patch.

In another illustrative embodiment, the feature descriptor/descriptor space may be transformed, e.g., partitioned, based on orientation direction, i.e., based on the direction of the sub-patch gradients. Said another way, a sub-descriptor/sub-space may be specified or defined for each of a set of specified gradient directions. Thus, following the above SIFT example, this would result in 8 feature components or partitions of 16 dimensions each. That is, each feature component/sub-descriptor may include the 16 bins from the 16 sub-patches for a respective direction (e.g., one of 8 values) obtained by sampling the same orientation bin from each of the 16 sub-patches in the original 128 dimension SIFT descriptor. Thus, there may be a sub-descriptor specified for all pixels in the patch with a gradient direction of 1, another for a direction of 2, and so forth. Thus, the specified subsets of image data of the image patch can overlap. This notion may also be extended to other aspects of the patch data. For example, in one exemplary embodiment, a sub-descriptor may be defined or specified for each of a plurality of colors present in the patch. In other embodiments, any attributes of the image patches may be used to "partition" the patch, and thus the feature descriptor space, as desired.

Thus, each sub-descriptor may correspond to a portion of image patch data, e.g., image information, that is not restricted to some respective spatial portion or subset of the patch, i.e., where specific data from each sub-patch may define the subspace/sub-descriptor.

Summarizing the above, the feature descriptor (and similarly, the image feature descriptor space) may be transformed, e.g., partitioned, into sub-descriptors (sub-spaces) that may be specified to correspond to respective (and possibly overlapping) portions or partitions of image data for specified image patches, where the portions or partitions may be spatial or non-spatial, and where each sub-descriptor may be specified to encode a corresponding feature component.

Thus, in various embodiments, the image feature descriptor space (and thus, corresponding feature descriptors) may include a plurality of subspaces (with corresponding sub-descriptors) in accordance with any of a variety of transformation schemes, so long as the subspaces collectively span the descriptor space.

In 304, each subspace of the plurality of subspaces may be quantized using cluster analysis applied to the sub-descriptors, thereby determining a respective one or more feature primitives for each subspace, where the feature primitives are useable to characterize image features. Note that the quantization/clustering is performed in each lower dimensional subspace (e.g., of 32 dimensions), and so is much more computationally tractable than quantizing/clustering the overall feature descriptor space (e.g., 128 dimensions).

More specifically, suppose the dimensionality of each feature descriptor is M (e.g., 128), and the descriptor is divided into C (e.g., 4) components (sub-descriptors), then the dimension for each component/sub-descriptor is M/C. Thus, the complexity/cost of the clustering operation is $O(M/C*N*\log(K))$. Thus, considering a SIFT descriptor (128 dimensions) as an example, if the descriptor is decomposed into 4 sub-spaces, then each sub-descriptor has only 32 dimensions. Note that for the decomposed components, since the dimension is much lower, only a very small number of clusters is required. Again, using the SIFT descriptor as an example, with the original 128 dimension descriptor (space), approximately 1 million (1M) clusters are generally needed to be effective in object retrieval. However, for the 32 dimensional components, only around 1,000 (1K) clusters are needed for efficient retrieval.

In one embodiment, the plurality of images may include or be a set of representative images of a larger collection, or may be the collection itself.

In some embodiments, the method may further include determining the feature descriptors. For example, the method may include: for each image of the plurality of images, analyzing the image to determine one or more key points that indicate or are associated with corresponding features in the image, then, for each key point, determining a respective image patch that includes the key point, and for each respective image patch, determining a corresponding feature descriptor (and so the receiving the plurality of feature descriptors of 302 may mean or include receiving the determined feature descriptors). Said another way, each image (of the plurality of images) may be analyzed to determine points of interest, i.e., key points, that indicate or are associated with corresponding features in the image, e.g., areas of high detail, as well as respective image patches for each key point.

Then, for each point of interest, the image patch (see, e.g., FIGS. 6A and 6B) that includes the point may be analyzed to detect and characterize the associated feature and its components. More specifically, each image patch (that includes a key point) may be partitioned into sub-patches per the specified transformation, e.g., partitioning, scheme, and the sub-patches analyzed to populate the sub-descriptors, thereby populating the feature descriptor for that patch.

Recapitulating the above, once the various features and feature components in the image patches (for each image) are detected, cluster analysis may be performed per sub-space, i.e., per specified sub-descriptor, to quantize the classification of the numerous feature components into a smaller number of distinguishing component types or classes, referred to as feature primitives. In other words, cluster analysis is applied to the detected feature components to determine natural groupings of the components, which may correspond to a set of natural feature primitives that may be used to represent features, e.g., where each feature may be represented by an ordered sequence of feature components, and thus, each feature descriptor may include an ordered sequence of sub-descriptors, per the transformation scheme specified.

It should be noted that in some embodiments, different feature primitive sets may be determined for different respective portions of the patches. For example, much as the letter frequency of first letters of words is generally different from that of middle or last letters of words, there may be respective sets of feature primitive that most appropriately characterize particular portions of patches. For example, following the above example of "bullet hole" analysis mentioned above, in one embodiment a set of feature primitives may be defined or specified for a center (disc) partition or sub-patch, and a different set of feature primitives (possibly overlapping with the first set) may be defined or specified for each of one or more concentric rings (annular sub-patches) around the central partition. Such use of multiple feature primitive sets may improve the efficiency of image operations. Similarly, in a more extreme example of overlapping partitions and multiple sets of feature primitives, in one embodiment, e.g., in a case where an image has multiple layers of semantic content, e.g., where multiple effects/images have been overlaid to form the image, different sets of feature primitives may be applied to different layers of the same (areas of a) patch (or, alternatively, to two partitions or sub-patches with the same or nearly the same pixel sets), e.g., to detect and/or characterize different overlapping features in the image. In other words, different visual "alphabets" may be applied to identify different visual "words" in the same visual "text". In another embodiment, different partitions or sub-patches may be specified or generated by sampling a patch at different resolutions, thereby generating feature data at different scales, to which particular sets of feature primitives may be applied.

Thus, as discussed above, in some embodiments, each sub-descriptor may correspond to a respective portion of patch data that is not a spatial partition, e.g., where the data for each sub-descriptor may be from multiple portions of or even all of the patch. Of course, any combination of the above approaches may be used as desired, e.g., the space may be spatially partitioned and/or partitioned in accordance with other, e.g., non-spatial, aspects. Similarly, the feature descriptor may be transformed via any of a variety of transformation schemes applied to any of all of the elements of the feature descriptor. Moreover, in some embodiments, different sets of feature primitives (visual alphabets) may be defined and applied for different groups (including groups of one) of sub-descriptors.

Thus, summarizing the above at a high level, a new representation for images is presented, e.g., in the context of image representation and retrieval. Note that prior approaches (which borrow heavily from the text retrieval field, specifically defining a "vocabulary" of discrete features that make up the images, and using term (feature) frequency distributions to represent the images, analogously to indexing text documents for retrieval) have a significant problem, in that the "vocabulary" for images (e.g., identifiers for all possible features) needs to be huge (there are millions of different features possible) to be effective, and needs to be learned from distributions of high-dimensional continuous-valued image features. This clustering process is very slow, as is the process of computing the representation for a given image, and doing the actual search. Thus, in embodiments of the method of FIG. 3, image features (e.g., visual "words") may be decomposed and analyzed to determine lower-level constituent elements (e.g., feature primitives or "visual letters") that can be combined together to form a very large number of different features (e.g., visual words), even with a small set of elements. In one embodiment, these constituent elements or feature primitives may be referred to as "graphemes" (which corresponds to the spoken language concept of phonemes, but referring to image feature components instead of verbal components). Note that the spatial order of the sub-descriptor patches specifies the order of the "visual letters" that form the feature or "visual word". Thus, the use of feature primitives to form features is analogous to using a fixed small-sized alphabet to generate a very large number of words.

Note that using the above approach provides a significant speed and memory advantage in image operations, e.g., in the training process for image classification, in computing the representation for an image, in performing image searches, and so forth, as will be discussed below. Note that the clustering process described herein, i.e., the component based cluster analysis for each feature component (sub-descriptor) to determine the set (or sets) of feature primitives (e.g., the grapheme vocabulary), is preferably performed offline, e.g., as a pre-process, since this process may be somewhat expensive computationally, and may be referred to as training or feature training. Thus, in some embodiments, the cluster analysis of 304 of FIG. 3 may be performed as a pre-process, where one or more operations using the determined feature primitives may be performed in real time, e.g., as part of an interactive process.

Figure 4:
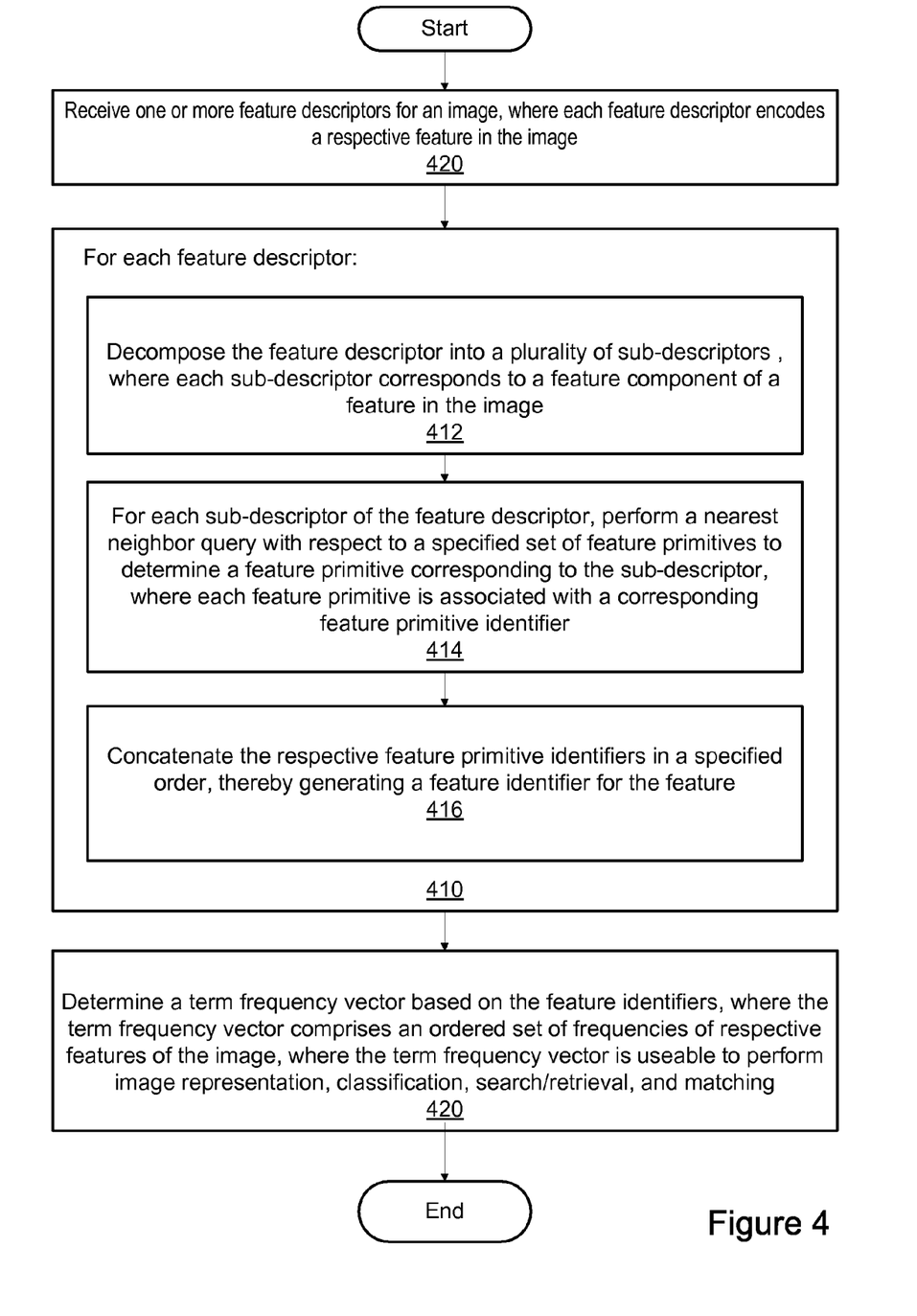
FIG. 4 is a flowchart of a method for analyzing digital images, according to one embodiment.

FIG. 4—Method for Analyzing Digital Images

FIG. 4 is a flowchart of a method for analyzing digital images, according to one embodiment, where images may be analyzed based on the concepts described above with respect to FIG. 3. The method shown in FIG. 4 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

As FIG. 4 shows, in 402, one or more features descriptors for an image may be received, where each feature descriptor encodes a respective feature in the image. Note that in various embodiments, the feature descriptors for the image may have been pre-computed and received from some external entity, e.g., from a computer over a network, or may be computed as part of the present method, e.g., based on a received image, or some other representation of the image or its features. In one embodiment, the feature descriptors may be SIFT feature descriptors, although any other types of feature descriptors may be used as desired, as described above.

In 410, each feature descriptor of the image may be analyzed, per method elements 412-416, described below.

In 412, the feature descriptor may be transformed into a plurality of sub-descriptors (i.e., descriptor components), where each sub-descriptor corresponds to a feature component of a feature in the image. For example, in one embodiment where the transform is a simple partition, the feature descriptor may be split into equal portions, e.g., for a 128 dimensional SIFT descriptor, the descriptor may be divided into 4 32-dimensional sub-descriptor, i.e., sub-descriptors. However, as noted above, other transformation schemes may be used as desired, e.g., using different numbers of partitions, with or without overlap, spatial or non-spatial, contiguous or non-contiguous, of various shapes, linear and/or non-linear transforms of subsets of the descriptor elements and/or image data, and so forth. Note that the transformation of the feature descriptor corresponds to an analogous partitioning of the corresponding patch, i.e., into sub-patches (however defined).

Expressed in a slightly different manner, the feature descriptor decomposition can be quite general. Specifically, each sub-descriptor may be a vector obtained through a mapping function from the feature descriptor space to a lower dimensional space. Note that each component of the feature descriptor may (should) be represented in at least one of the sub-descriptors, either directly as a sub-descriptor component, or indirectly in combination, such as linear combination, with other feature descriptor components. Aside from this requirement, there is no restriction on the types of mappings that may be used to form the sub-descriptors.

Examples of possible transformations, e.g., decompositions, include directly partitioning the feature descriptor components into disjoint or overlapping subsets, where each subset constitutes a sub-descriptor. Alternatively, the sub-components may be obtained by linear combination of one or more feature descriptor components. For example, principle component analysis (PCA) may be used to determine a set of linear projections of the feature descriptor into lower-dimensional subspaces. Additionally, the mapping may be non-linear, such as projecting the descriptor onto a lower-dimensional hypersphere.

The effectiveness of a particular set of mappings to obtain sub-descriptors depends on the distribution of feature descriptors in feature descriptor space. In many practical applications, partitioning is effective for descriptors such as SIFT that have an intrinsic structure that induces natural partitionings, such as those depicted in FIGS. 6A and 6B.

In 414, for each sub-descriptor of the feature descriptor, a nearest neighbor query may be performed with respect to a specified set of feature primitives to determine a feature primitive corresponding to the sub-descriptor. In one embodiment, the set of feature primitives may have been determined or defined as described above with reference to FIG. 3. Each feature primitive may be associated with a corresponding feature primitive identifier, e.g., some code letter, number, word, sequence, pattern, or symbol. For example, a look-up table, database, hash, etc., may store or encode the associative relationship between the feature primitives and their respective codes or identifiers (IDs).

In some embodiments, each (local) feature descriptor may be or include a compact representation of the local appearance of the feature, and, as described above, may be formed by building histogram statistics of some low-level features, e.g., pixel gradients, together with some structure information of the local image patch.

As discussed above, there are many ways to transform, e.g., 1decompose, the 128 dimensional descriptor (or vector), but a transformation is desired such that the components are relatively independent of each other. To this end, in one embodiment, the structure information inherent in the 128 dimension SIFT descriptor may be relied on, where, for example, the 4×4 patches are themselves divided into 2×2 sub-descriptor patches, with each sub-descriptor patch consisting of 4 adjacent (SIFT) sub-patches forming a quadrant. The particular transformation, e.g., partitioning, scheme used may depend upon the images considered and/or the application. For example, as discussed above, in various embodiments, each sub-descriptor may correspond to a spatial portion of a patch, or to some portion of patch data, e.g., image information, that is not restricted to respective spatial portions of the patch, e.g., where each sub-descriptor may be based on the direction of the sub-patch gradients (as specified), or some transform thereof.

In 416, the respective feature primitive identifiers may be concatenated in a specified order, thereby generating a feature identifier for the feature, i.e., a "visual ID" for the feature. In other words, the determined feature primitive identifiers may be strung together in a specified order, i.e., sequenced, to form or compose a feature identifier for the feature.

Thus, the assignment of a visual ID to a feature descriptor may be achieved by decomposing the descriptor into components, referred to as sub-descriptors (with each component or sub-descriptor corresponding to a subspace of the image feature descriptor or component space), determining a nearest neighbor cluster (in the image feature descriptor or component space), and thus, the nearest feature primitive or component ID, for each component, and concatenating the visual primitive or component IDs to generate or construct the visual ID for the feature. Said a slightly different way, to determine the visual ID for a descriptor, the descriptor may be decomposed into sub-descriptors or components, and for each sub-descriptor or component, its feature primitive or component ID may be determined via a nearest neighbor query of the feature primitives, e.g., graphemes, to determine the (closest) primitive/grapheme and corresponding ID that correspond to the sub-descriptor component. Then the visual ID for the feature, i.e., for the entire descriptor, may be obtained by concatenating the feature primitive IDs, e.g., the visual IDs of each sub-descriptor or component. In this way, even though the number of clusters (candidate feature primitives/IDs) for each sub-descriptor or component may be small, the possible variations of a concatenation of them can be very large. For example, if there are 512 clusters for each sub-descriptor or component ($2^9$=512), then, theoretically, the number of possible features specified by the total or combined visual ID is $2^{36}$=64 billion (64B).

Thus, method elements 412-416 may be performed with respect to each feature descriptor for an image, producing a set of corresponding feature identifiers that represent the features in the image.

In 420, a term frequency vector may be determined based on the feature identifiers. The term frequency vector may include an ordered set of frequencies of respective features. In other words, the term frequency vector may include an ordered sequence of the number of occurrences of each feature in the image, and thus may characterize or represent the image in terms of its features. In some embodiments, the frequency values may be normalized, e.g., with respect to the total number of features in the image, e.g., 5 faces/25 features results in a face frequency of 0.2 (or, on a percent scale, 20.0). Note, however, that any normalization value may be used as desired. The term frequency vector may be useable to perform image representation, classification, search/retrieval, and matching, among other image operations, as will be discussed further with respect to FIG. 5.

Query Dependent Distance Measure

In a typical image retrieval system, the images are represented as a term frequency vector, and the distance between two vectors is usually defined as the Euclidean distance, or some other suitable distance. However, for the visual vocabulary disclosed herein, e.g., the above-described grapheme vocabulary, the number of bins or feature primitives that two images share may typically be very small; in this sense, use of a distance measure that uses all the dimensions of the vector (for example the Euclidean distance) may be problematic because it treats all the dimensions equally, regardless of the importance of each dimension to the query. The result of this is that the distance may be dominated by those dimensions that are actually irrelevant to the query. Thus, a query dependent distance measure may be used, where the difference is computed using only those (feature) dimensions that appear in the query feature vector, as described below.

Figure 5:
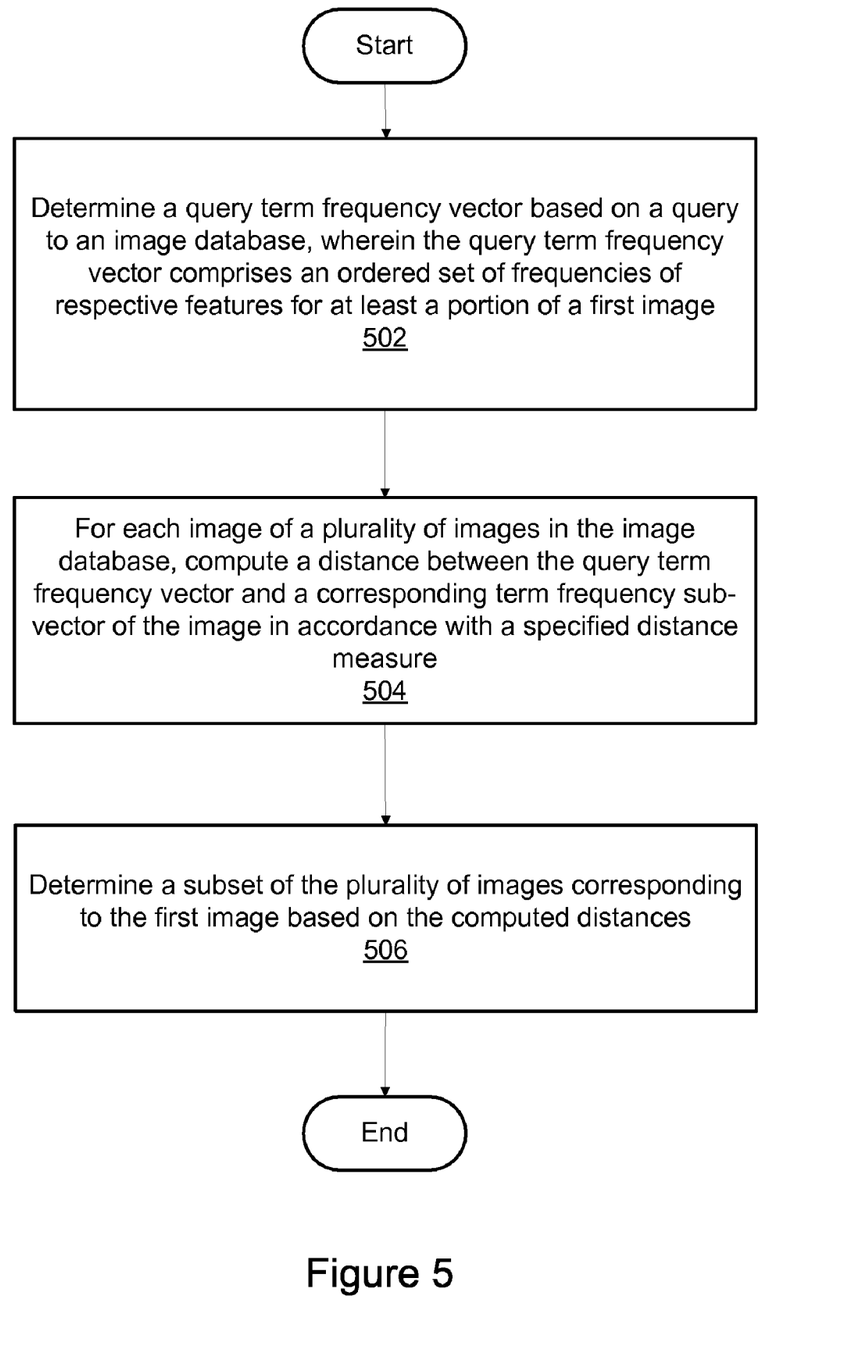
FIG. 5 is a flowchart of a method of searching for digital images, according to one embodiment, according to one embodiment.

FIG. 5—Method of Searching for Digital Images

FIG. 5 is a flowchart of a method for analyzing digital images, e.g., for an image search, according to one embodiment. The method shown in FIG. 5 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

In 502, a query term frequency vector may be determined based on a query to an image database, where the query term frequency vector includes an ordered set of frequencies of respective features for at least a portion of a first image, as mentioned above. Note that the query may be of any type desired. For example, in one embodiment, the query may be an image for which a match is to be found (e.g., in an image database), and the query term frequency vector may be determined as described above with reference to FIG. 4. In one exemplary embodiment, a user may indicate or select a portion of an image, e.g., via dragging a mouse, and a corresponding frequency vector may be determined for the image portion, and so the image portion serves as the image from which the frequency vector is determined. In other exemplary embodiments, the query may be a set of keywords, tags, feature list, or any other type of query, or a representation thereof, from which a frequency vector may be generated.

In 504, for each image of a plurality of images in the image database, a distance between the query term frequency vector and a corresponding term frequency sub-vector of the image may be computed in accordance with a specified distance measure. Said another way, the degree of difference between the query term frequency vector of 502 and corresponding term frequency sub-vectors of the images to be searched may be determined. Note that the query term frequency vector is preferably a sparse vector that only includes dimensions of the descriptor space that are germane to the query, and so may be considered to be a sub-vector of the (total) frequency vector of maximum possible dimensionality for the image. Note further that the term frequency sub-vectors of the images to be searched are similarly of lesser dimensionality than their corresponding total frequency vectors. More specifically, the query term frequency vector and each term frequency sub-vector preferably have the same dimensionality (and the same dimensions). Thus, only those feature sub-spaces (sub-descriptors) of the images that are germane to the query may be analyzed.

Note that the distance measure may be of any type desired. For example, define a query vector q=[ . . . , $q_i$ . . . ]. and a vector in the database d=[ . . . , $d_i$, . . . ]. The query-dependent distance may be represented thusly:

$$D(q,d)=\Sigma f(q_i,d_i), \text{ for all } i \text{ such that } q_i>0. \qquad (1)$$

where $f(q_i,d_i)$ may be any of various distance measures, e.g., $|q_i-d_i|$, $(q_i-d_i)^2$, $\min(q_i, d_i)$, etc., for example, depending on the underlying metric specified. That is, only those components of the vector that are non-zero in the query may be considered. The set of non-zero components in the query vector define or specify a subspace of the overall term frequency space. Thus, $D(q_i, d_i)$ is the distance between frequency vectors q and d when projected into this subspace.

Thus, the query and each image in the database may be represented as a very sparse high dimensional vector (with the dimensionality corresponding to the number of possible different feature IDs), and thus, is a term (cluster or feature ID) frequency vector with each vector element indicating how many features in the image belong to that cluster. As noted above, the feature frequency vector is preferably normalized by the number of features in the image.

Note that in some embodiments, use of the above techniques may result in some loss in retrieval accuracy, since the occurrence of "typos" (incorrect grapheme assignments) may result in more incorrect matches; however experimental results indicate that this loss does not seriously hamper retrieval, and the performance gains are enormous. Also, note that exploiting the inherent structure in the image features to find a natural decomposition of the features (visual words) into their constituent elements helps mitigate this problem. In summary, embodiments of the techniques disclosed herein may facilitate efficient clustering a very large number of visual descriptors into a very large number of clusters, making the above techniques scalable to extremely large amounts of data, e.g., data on the World Wide Web or more generally, the Internet.

Thus, various embodiments of the systems and methods disclosed herein may be used to perform image representation, classification, search/retrieval, and/or matching.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-readable storage medium that stores program instructions computer-executable to implement:
   receiving a plurality of feature descriptors for a plurality of images, wherein each feature descriptor encodes a respective feature in an image, and wherein each feature descriptor is transformed into a plurality of sub-descriptors in accordance with a specified transformation scheme, wherein the feature descriptors correspond to an image feature descriptor space for the plurality of images, wherein the sub-descriptors correspond to a plurality of subspaces of the image feature descriptor space, and wherein the plurality of subspaces span the image feature descriptor space; and
   quantizing each subspace of the plurality of subspaces using cluster analysis applied to the sub-descriptors, thereby determining a respective one or more feature primitives for each subspace, wherein the feature primitives are useable to characterize image features.

2. The computer-readable storage medium of claim 1, wherein each feature descriptor comprises a specified number of elements, wherein each element corresponds to a respective dimension of the image feature descriptor space, wherein each sub-descriptor comprises a transformation of a respective at least a subset of the elements of the feature descriptor, and wherein each sub-descriptor encodes a respective feature component of the feature.

3. The computer-readable storage medium of claim 2, wherein at least one of the sub-descriptors comprises a transformation of a contiguous subset of the elements of the feature descriptor.

4. The computer-readable storage medium of claim 2, wherein at least one of the sub-descriptors comprises a transformation of a discontiguous subset of the elements of the feature descriptor.

5. The computer-readable storage medium of claim 2, wherein at least two of the sub-descriptors comprise respective transformations of overlapping subsets of the elements of the feature descriptor.

6. The computer-readable storage medium of claim 2, wherein each sub-descriptor corresponds to a respective specified subset of image data for an image patch of an image.

7. The computer-readable storage medium of claim 6, wherein at least one of the subsets of image data comprises a contiguous subset of the image data.

8. The computer-readable storage medium of claim 7, wherein at least one of the subsets of image data comprises a discontiguous subset of the image data.

9. The computer-readable storage medium of claim 7, wherein at least two of the subsets of image data comprise overlapping subsets of the image data.

10. The computer-readable storage medium of claim 6, wherein the specified subsets of image data comprise image data of respective sub-patches of the image patch, wherein each sub-patch comprises one or more of:
   a spatial partition of the image patch, comprising a contiguous subset of pixels in the image patch;
   a non-spatial partition of the image patch, comprising attributes of the image patch that are distributed across the image patch; or
   a portion of the image patch that overlaps at least one other sub-patch of the image patch.

11. The computer-readable storage medium of claim 1, wherein the program instructions are further computer-executable to implement:
   for each image of the plurality of images:
      analyzing the image to determine one or more key points that indicate or are associated with corresponding features in the image;
      for each key point, determining a respective image patch that comprises the key point; and
      for each respective image patch, determining a corresponding feature descriptor;
   wherein said receiving a plurality of feature descriptors comprises receiving the determined feature descriptors.

12. The computer-readable storage medium of claim 11, wherein said determining a corresponding feature descriptor comprises:
   encoding the feature of the image, comprising:
      for each feature component of the feature, encoding the feature component of the feature in a respective sub-descriptor of the feature descriptor.

13. The computer-readable storage medium of claim 1, wherein the program instructions are further computer-executable to implement:
   receiving one or more feature descriptors for an image, wherein each feature descriptor encodes a respective feature in the image;
   for each feature descriptor of the image,
      transforming the feature descriptor into a plurality of sub-descriptors, wherein each sub-descriptor corresponds to a feature component of a feature in the image;
      for each sub-descriptor of the feature descriptor, performing a nearest neighbor query with respect to a specified set of feature primitives to determine a feature primitive corresponding to the sub-descriptor, wherein each feature primitive is associated with a corresponding feature primitive identifier;
      concatenating the respective feature primitive identifiers in a specified order, thereby generating a feature identifier for the feature; and
   determining a term frequency vector based on the feature identifiers, wherein the term frequency vector comprises an ordered set of frequencies of respective features of the image, wherein the term frequency vector is useable to perform image representation, classification, search/retrieval, and matching.

14. The computer-readable storage medium of claim 1, wherein the program instructions are further computer-executable to implement:
   determining a query term frequency vector based on a query to an image database, wherein the query term frequency vector comprises an ordered set of frequencies of respective features for at least a portion of a first image;
   for each image of a plurality of images in the image database,
      computing a distance between the query term frequency vector and a corresponding term frequency sub-vector of the image in accordance with a specified distance measure; and
   determining a subset of the plurality of images corresponding to the first image based on the computed distances.

15. The computer-readable storage medium of claim 1, wherein said quantizing each subspace of the plurality of subspaces using cluster analysis applied to the sub-descriptors is performed as a pre-process, and wherein the program instructions are further computer-executable to perform one or more operations using the determined feature primitives in real time.

16. The computer-readable storage medium of claim 1, wherein the transformation scheme comprises one or more of:
   a partitioning;
   a linear transformation; or
   a non-linear transformation.

17. A computer-implemented method, comprising:
   receiving a plurality of feature descriptors for a plurality of images, wherein each feature descriptor encodes a respective feature in an image, and wherein each feature descriptor is transformed into a plurality of sub-descriptors in accordance with a specified transformation scheme, wherein the feature descriptors correspond to an image feature descriptor space for the plurality of images, wherein the sub-descriptors correspond to a plurality of subspaces of the image feature descriptor space, and wherein the plurality of subspaces span the image feature descriptor space; and
   quantizing each subspace of the plurality of subspaces using cluster analysis applied to the sub-descriptors, thereby determining a respective one or more feature primitives for each subspace, wherein the feature primitives are useable to characterize image features.

18. The computer-implemented method of claim 17, wherein each feature descriptor comprises a specified number of elements, wherein each element corresponds to a respective dimension of the image feature descriptor space, wherein each sub-descriptor comprises a transformation of a respective at least a subset of the elements of the feature descriptor, and wherein each sub-descriptor encodes a respective feature component of the feature.

19. The computer-implemented method of claim 18, wherein at least one of the sub-descriptors comprises a transformation of a contiguous subset of the elements of the feature descriptor.

20. The computer-implemented method of claim 18, wherein at least one of the sub-descriptors comprises a transformation of a discontiguous subset of the elements of the feature descriptor.

21. The computer-implemented method of claim 18, wherein at least two of the sub-descriptors comprise respective transformations of overlapping subsets of the elements of the feature descriptor.

22. The computer-implemented method of claim 18, wherein each sub-descriptor corresponds to a respective specified subset of image data for an image patch of an image.

23. The computer-implemented method of claim 22, wherein at least one of the subsets of image data comprises a contiguous subset of the image data.

24. The computer-implemented method of claim 23, wherein at least one of the subsets of image data comprises a discontiguous subset of the image data.

25. The computer-implemented method of claim 23, wherein at least two of the subsets of image data comprise overlapping subsets of the image data.

26. The computer-implemented method of claim 22, wherein the specified subsets of image data comprise image data of respective sub-patches of the image patch, wherein each sub-patch comprises one or more of:

a spatial partition of the image patch, comprising a contiguous subset of pixels in the image patch;
   a non-spatial partition of the image patch, comprising attributes of the image patch that are distributed across the image patch; or
   a portion of the image patch that overlaps at least one other sub-patch of the image patch.

27. The computer-implemented method of claim 17, wherein the program instructions are further computer-executable to implement:
   for each image of the plurality of images:
      analyzing the image to determine one or more key points that indicate or are associated with corresponding features in the image;
      for each key point, determining a respective image patch that comprises the key point; and
      for each respective image patch, determining a corresponding feature descriptor;
   wherein said receiving a plurality of feature descriptors comprises receiving the determined feature descriptors.

28. The computer-implemented method of claim 27, wherein said determining a corresponding feature descriptor comprises:
   encoding the feature of the image, comprising:
      for each feature component of the feature, encoding the feature component of the feature in a respective sub-descriptor of the feature descriptor.

29. The computer-implemented method of claim 17, wherein the program instructions are further computer-executable to implement:
   receiving one or more feature descriptors for an image, wherein each feature descriptor encodes a respective feature in the image;
   for each feature descriptor of the image,
      transforming the feature descriptor into a plurality of sub-descriptors, wherein each sub-descriptor corresponds to a feature component of a feature in the image;
      for each sub-descriptor of the feature descriptor, performing a nearest neighbor query with respect to a specified set of feature primitives to determine a feature primitive corresponding to the sub-descriptor, wherein each feature primitive is associated with a corresponding feature primitive identifier; and
      concatenating the respective feature primitive identifiers in a specified order, thereby generating a feature identifier for the feature; and
   determining a term frequency vector based on the feature identifiers, wherein the term frequency vector comprises an ordered set of frequencies of respective features of the image, wherein the term frequency vector is useable to perform image representation, classification, search/retrieval, and matching.

30. The computer-implemented method of claim 17, wherein the program instructions are further computer-executable to implement:
   determining a query term frequency vector based on a query to an image database, wherein the query term frequency vector comprises an ordered set of frequencies of respective features for at least a portion of a first image;
   for each image of a plurality of images in the image database,
      computing a distance between the query term frequency vector and a corresponding term frequency sub-vector of the image in accordance with a specified distance measure; and determining a subset of the plurality of images corresponding to the first image based on the computed distances.

31. The computer-implemented method of claim 17, wherein said quantizing each subspace of the plurality of subspaces using cluster analysis applied to the sub-descriptors is performed as a pre-process, and wherein the program instructions are further computer-executable to perform one or more operations using the determined feature primitives in real time.

32. The computer-implemented method of claim 17, wherein the transformation scheme comprises one or more of:
 a partitioning;
 a linear transformation; or
 a non-linear transformation.

33. A system, comprising:
 at least one processor; and
 a memory coupled to the at least one processor, wherein the memory stores program instructions, wherein the program instructions are executable by the at least one processor to:
  receive a plurality of feature descriptors for a plurality of images, wherein each feature descriptor encodes a respective feature in an image, and wherein each feature descriptor is transformed into a plurality of sub-descriptors in accordance with a specified transformation scheme, wherein the feature descriptors correspond to an image feature descriptor space for the plurality of images, wherein the sub-descriptors correspond to a plurality of subspaces of the image feature descriptor space, and wherein the plurality of subspaces span the image feature descriptor space; and
  quantize each subspace of the plurality of subspaces using cluster analysis applied to the sub-descriptors, thereby determining a respective one or more feature primitives for each subspace, wherein the feature primitives are useable to characterize image features.

34. The system of claim 33, wherein each feature descriptor comprises a specified number of elements, wherein each element corresponds to a respective dimension of the image feature descriptor space, wherein each sub-descriptor comprises a transformation of a respective at least a subset of the elements of the feature descriptor, and wherein each sub-descriptor encodes a respective feature component of the feature.

35. The system of claim 34, wherein at least one of the sub-descriptors comprises a transformation of a contiguous subset of the elements of the feature descriptor.

36. The system of claim 34, wherein at least one of the sub-descriptors comprises a transformation of a discontiguous subset of the elements of the feature descriptor.

37. The system of claim 34, wherein at least two of the sub-descriptors comprise respective transformations of overlapping subsets of the elements of the feature descriptor.

38. The system of claim 34, wherein each sub-descriptor corresponds to a respective specified subset of image data for an image patch of an image.

39. The system of claim 38, wherein at least one of the subsets of image data comprises a contiguous subset of the image data.

40. The system of claim 39, wherein at least one of the subsets of image data comprises a discontiguous subset of the image data.

41. The system of claim 39, wherein at least two of the subsets of image data comprise overlapping subsets of the image data.

42. The system of claim 38, wherein the specified subsets of image data comprise image data of respective sub-patches of the image patch, wherein each sub-patch comprises one or more of:
 a spatial partition of the image patch, comprising a contiguous subset of pixels in the image patch;
 a non-spatial partition of the image patch, comprising attributes of the image patch that are distributed across the image patch; or
 a portion of the image patch that overlaps at least one other sub-patch of the image patch.

43. The system of claim 33, wherein the program instructions are further computer-executable to implement:
 for each image of the plurality of images:
  analyzing the image to determine one or more key points that indicate or are associated with corresponding features in the image;
  for each key point, determining a respective image patch that comprises the key point; and
  for each respective image patch, determining a corresponding feature descriptor;
 wherein said receiving a plurality of feature descriptors comprises receiving the determined feature descriptors.

44. The system of claim 43, wherein said determining a corresponding feature descriptor comprises:
 encoding the feature of the image, comprising:
  for each feature component of the feature, encoding the feature component of the feature in a respective sub-descriptor of the feature descriptor.

45. The system of claim 33, wherein the program instructions are further computer-executable to implement:
 receiving one or more feature descriptors for an image, wherein each feature descriptor encodes a respective feature in the image;
 for each feature descriptor of the image,
  transforming the feature descriptor into a plurality of sub-descriptors, wherein each sub-descriptor corresponds to a feature component of a feature in the image;
  for each sub-descriptor of the feature descriptor, performing a nearest neighbor query with respect to a specified set of feature primitives to determine a feature primitive corresponding to the sub-descriptor, wherein each feature primitive is associated with a corresponding feature primitive identifier; and
  concatenating the respective feature primitive identifiers in a specified order, thereby generating a feature identifier for the feature; and
 determining a term frequency vector based on the feature identifiers, wherein the term frequency vector comprises an ordered set of frequencies of respective features of the image, wherein the term frequency vector is useable to perform image representation, classification, search/retrieval, and matching.

46. The system of claim 33, wherein the program instructions are further computer-executable to implement:
 determining a query term frequency vector based on a query to an image database, wherein the query term frequency vector comprises an ordered set of frequencies of respective features for at least a portion of a first image;
 for each image of a plurality of images in the image database,
  computing a distance between the query term frequency vector and a corresponding term frequency sub-vector of the image in accordance with a specified distance measure; and determining a subset of the plurality of images corresponding to the first image based on the computed distances.

47. The system of claim 33, wherein said quantizing each subspace of the plurality of subspaces using cluster analysis applied to the sub-descriptors is performed as a pre-process, and wherein the program instructions are further computer-executable to perform one or more operations using the determined feature primitives in real time.

48. The system of claim 33, wherein the transformation scheme comprises one or more of:
    a partitioning;
    a linear transformation; or
    a non-linear transformation.

49. A computer-implemented method, comprising:
    executing instructions on a specific apparatus to receive binary digital electronic signals representing a plurality of feature descriptors for a plurality of images, wherein each feature descriptor encodes a respective feature in an image, and wherein each feature descriptor is transformed into a plurality of sub-descriptors in accordance with a specified transformation scheme, wherein the feature descriptors correspond to an image feature descriptor space for the plurality of images, wherein the sub-descriptors correspond to a plurality of subspaces of the image feature descriptor space, and wherein the plurality of subspaces span the image feature descriptor space; and
    executing instructions on said specific apparatus so that binary digital electronic signals representing a respective one or more feature primitives for each subspace are determined by quantizing each subspace of the plurality of subspaces using cluster analysis applied to the sub-descriptors, wherein the feature primitives are useable to characterize image features quantizing each subspace of the plurality of subspaces using cluster analysis applied to the sub-descriptors; and
    storing the determined one or more feature primitives for each subspace in a memory medium of said specific apparatus for later use.

* * * * *